United States Patent
Niergarth et al.

(10) Patent No.: US 11,906,163 B2
(45) Date of Patent: Feb. 20, 2024

(54) FUEL OXYGEN CONVERSION UNIT WITH INTEGRATED WATER REMOVAL

(71) Applicant: General Electric Company, Schenectady, NY (US)

(72) Inventors: Daniel Alan Niergarth, Norwood, OH (US); Sridhar Adibhatla, Glendale, OH (US); Ethan Patrick O'Connor, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 528 days.

(21) Appl. No.: 16/864,357

(22) Filed: May 1, 2020

(65) Prior Publication Data

US 2021/0341145 A1 Nov. 4, 2021

(51) Int. Cl.
*F23K 5/18* (2006.01)
*F02C 7/236* (2006.01)
(Continued)

(52) U.S. Cl.
CPC ............. *F23K 5/18* (2013.01); *F02C 7/236* (2013.01); *F23K 5/20* (2013.01); *B01D 19/0031* (2013.01);
(Continued)

(58) Field of Classification Search
None
See application file for complete search history.

(56) References Cited

U.S. PATENT DOCUMENTS 2,582,842 A 1/1952 Messinger
2,720,313 A 10/1955 Pattison
(Continued)

FOREIGN PATENT DOCUMENTS

EP 2003311 A2 12/2008
EP 3018304 A1 5/2016
(Continued)

OTHER PUBLICATIONS

Landfill, Sewage, Biogas, Coal, Seam & Mines Gas Separation/Filtration, Kelburn Engineering—LandfillGas and Air Separation, 3 pages. www.kelburneng.com.uk//landfill-gas-bio-gas-sewer-gas.php.

*Primary Examiner* — Jason M Greene
(74) *Attorney, Agent, or Firm* — Dority & Manning, P.A.

(57) ABSTRACT

A fuel delivery system for a gas turbine engine includes a fuel source; a draw pump downstream of the fuel source for generating a liquid fuel flow from the fuel source; a main fuel pump downstream of the draw pump; and a fuel oxygen reduction unit downstream of the draw pump and upstream of the main fuel pump. The fuel oxygen reduction unit includes a stripping gas line; a contactor in fluid communication with the stripping gas line and the draw pump for forming a fuel/gas mixture, wherein the contactor receives an inlet fuel flow from the draw pump; a separator in fluid communication with the contactor, the separator receives the fuel/gas mixture and separates the fuel/gas mixture into an outlet stripping gas flow and an outlet fuel flow at a location upstream of the main fuel pump; a catalyst disposed downstream of the separator, the catalyst receives and treats the outlet stripping gas flow, wherein a stripping gas stream flows out the catalyst; and a water removal component disposed between the catalyst and the contactor, wherein the water removal component removes water from the stripping gas stream.

21 Claims, 5 Drawing Sheets

(51) Int. Cl.
*F23K 5/20* (2006.01)
*B01D 19/00* (2006.01)

(52) U.S. Cl.
CPC .. *B01D 2257/104* (2013.01); *B01D 2257/504* (2013.01); *B01D 2257/80* (2013.01); *F05D 2220/323* (2013.01); *F05D 2270/301* (2013.01); *F23K 2300/202* (2020.05); *F23K 2300/204* (2020.05); *F23K 2900/05082* (2013.01)

(56) References Cited

U.S. PATENT DOCUMENTS

| | | | |
|---|---|---|---|
| 2,893,628 A | 7/1959 | Herman | |
| 3,050,240 A | 8/1962 | Darnell | |
| 3,178,105 A | 4/1965 | Darnell | |
| 3,590,559 A | 7/1971 | Bragg | |
| 3,847,298 A | 11/1974 | Hamilton | |
| 3,895,243 A | 7/1975 | Amend et al. | |
| 3,902,658 A | 9/1975 | Madsen | |
| 4,169,567 A | 10/1979 | Tamura | |
| 4,170,116 A | 10/1979 | Williams | |
| 4,449,372 A | 5/1984 | Rilett | |
| 4,503,682 A | 3/1985 | Rosenblatt | |
| 4,505,124 A | 3/1985 | Mayer | |
| 4,550,573 A | 11/1985 | Rannenberg | |
| 4,600,413 A | 7/1986 | Sugden | |
| 4,714,139 A | 12/1987 | Lorenz et al. | |
| 4,738,779 A | 4/1988 | Carroll et al. | |
| 4,755,197 A | 7/1988 | Benson et al. | |
| 4,773,212 A | 9/1988 | Griffin et al. | |
| 5,149,018 A | 9/1992 | Clark | |
| 5,267,608 A | 12/1993 | Coffinberry | |
| 5,341,636 A | 8/1994 | Paul | |
| 5,452,573 A | 9/1995 | Glickstein et al. | |
| 5,587,068 A | 12/1996 | Aho, Jr. et al. | |
| 5,622,621 A | 4/1997 | Kramer | |
| 5,667,168 A | 9/1997 | Fluegel | |
| 5,722,241 A | 3/1998 | Huber | |
| 5,724,806 A | 3/1998 | Homer | |
| 5,904,836 A | 5/1999 | Lee et al. | |
| 6,134,876 A | 10/2000 | Hines et al. | |
| 6,182,435 B1 | 2/2001 | Niggemann et al. | |
| 6,250,097 B1 | 6/2001 | Lui et al. | |
| 6,294,091 B1 | 9/2001 | Hoff | |
| 6,415,595 B1 | 7/2002 | Wilmot, Jr. et al. | |
| 6,435,454 B1 | 8/2002 | Engelhardt | |
| 6,701,717 B2 | 3/2004 | Flatman et al. | |
| 6,702,729 B2 | 3/2004 | Mazzuca | |
| 6,892,710 B2 | 5/2005 | Ekstam | |
| 6,939,392 B2 | 9/2005 | Huang et al. | |
| 7,093,437 B2 | 8/2006 | Spadaccini et al. | |
| 7,260,926 B2 | 8/2007 | Sabatino et al. | |
| 7,334,407 B2 | 2/2008 | Spadaccini et al. | |
| 7,377,098 B2 | 5/2008 | Walker et al. | |
| 7,387,602 B1 | 6/2008 | Kirsch | |
| 7,398,641 B2 | 7/2008 | Stretton et al. | |
| 7,431,818 B2 | 10/2008 | Cipollini | |
| 7,459,081 B2 | 12/2008 | Koenig et al. | |
| 7,536,851 B2 | 5/2009 | McLain | |
| 7,569,099 B2 | 8/2009 | Coffin et al. | |
| 7,628,965 B2 | 12/2009 | Johnson et al. | |
| 7,694,916 B2 | 4/2010 | Limaye et al. | |
| 7,735,670 B2 | 6/2010 | Zaki et al. | |
| 7,744,827 B2 | 6/2010 | Vanderspurt et al. | |
| 7,824,470 B2 | 11/2010 | Chiappetta et al. | |
| 7,836,680 B2 | 11/2010 | Schwarz et al. | |
| 7,882,704 B2 | 2/2011 | Chen | |
| 7,896,292 B2 | 3/2011 | Limaye et al. | |
| 7,905,259 B2 | 3/2011 | Johnson et al. | |
| 7,966,807 B2 | 6/2011 | Norris et al. | |
| 7,987,676 B2 | 8/2011 | Ast et al. | |
| 8,055,437 B2 | 11/2011 | Proietty et al. | |
| 8,141,360 B1 | 3/2012 | Huber | |
| 8,177,884 B2 | 5/2012 | Schmidt et al. | |
| 8,231,714 B2 | 7/2012 | Cornet et al. | |
| 8,261,528 B2 | 9/2012 | Chillar et al. | |
| 8,388,830 B2 | 3/2013 | Sohn et al. | |
| 8,450,020 B2 | 5/2013 | Sinha et al. | |
| 8,499,567 B2 | 8/2013 | Hagh et al. | |
| 8,499,822 B2 | 8/2013 | Bulin et al. | |
| 8,522,572 B2 | 9/2013 | Coffinberry et al. | |
| 8,602,362 B2 | 12/2013 | Buchwald | |
| 8,663,996 B2 | 3/2014 | Beeson | |
| 8,765,070 B2 | 7/2014 | Norton et al. | |
| 8,789,377 B1 | 7/2014 | Brostmeyer | |
| 8,821,362 B2 | 9/2014 | Kidd et al. | |
| 8,828,344 B2 | 9/2014 | K-WLam et al. | |
| 8,858,161 B1 | 10/2014 | Ryznic et al. | |
| 8,944,367 B2 | 2/2015 | Bystry, Jr. et al. | |
| 8,978,353 B2 | 3/2015 | Norton et al. | |
| 8,984,884 B2 | 3/2015 | Xu et al. | |
| 9,014,791 B2 | 4/2015 | Held | |
| 9,038,397 B2 | 5/2015 | Papa et al. | |
| 9,120,580 B2 | 9/2015 | Sampath | |
| 9,144,768 B2 | 9/2015 | Tichborne et al. | |
| 9,162,162 B2 | 10/2015 | Yount | |
| 9,231,267 B2 | 1/2016 | McAlister | |
| 9,435,246 B2 | 9/2016 | Devarakonda | |
| 9,567,095 B2 | 2/2017 | McCarthy et al. | |
| 9,580,185 B2 | 2/2017 | Rhoden et al. | |
| 9,644,838 B2 | 5/2017 | Zanganeh et al. | |
| 9,656,187 B2 | 5/2017 | Lo et al. | |
| 9,687,773 B2 | 6/2017 | Johnson et al. | |
| 9,724,625 B2 | 8/2017 | Lo | |
| 9,752,507 B2 | 9/2017 | Selstad et al. | |
| 9,771,867 B2 | 9/2017 | Karam et al. | |
| 9,834,315 B2 | 12/2017 | Lo et al. | |
| 9,863,322 B2 | 1/2018 | Williams | |
| 9,885,290 B2 | 2/2018 | Della-Fera et al. | |
| 9,897,054 B2 | 2/2018 | Lo et al. | |
| 10,273,880 B2 | 4/2019 | Kolvick et al. | |
| 10,280,760 B2 | 5/2019 | Joshi et al. | |
| 2005/0155353 A1* | 7/2005 | Sabatino | B64D 37/34 60/39.08 |
| 2009/0133380 A1 | 5/2009 | Donnerhack | |
| 2009/0158739 A1 | 6/2009 | Messmer | |
| 2009/0188234 A1 | 7/2009 | Suciu et al. | |
| 2010/0212857 A1 | 8/2010 | Bulin et al. | |
| 2010/0313591 A1 | 12/2010 | Lents et al. | |
| 2011/0262309 A1 | 10/2011 | Limaye et al. | |
| 2012/0216502 A1 | 8/2012 | Freund et al. | |
| 2012/0216677 A1* | 8/2012 | Koenig | B01D 19/0005 210/194 |
| 2013/0186100 A1 | 7/2013 | Rhoden et al. | |
| 2014/0075985 A1* | 3/2014 | Mckay | B01D 53/002 62/617 |
| 2014/0165570 A1 | 6/2014 | Herring | |
| 2014/0205446 A1 | 7/2014 | Patsouris et al. | |
| 2014/0345292 A1 | 11/2014 | Diaz et al. | |
| 2014/0360153 A1 | 12/2014 | Papa et al. | |
| 2015/0000291 A1 | 1/2015 | Smith et al. | |
| 2015/0040986 A1 | 2/2015 | Tichborne et al. | |
| 2015/0072850 A1 | 3/2015 | Derrick et al. | |
| 2015/0159867 A1 | 6/2015 | Patrick et al. | |
| 2016/0003160 A1 | 1/2016 | Hagshenas | |
| 2016/0096629 A1 | 4/2016 | Vaisman | |
| 2016/0108814 A1 | 4/2016 | Schmitz | |
| 2016/0138431 A1 | 5/2016 | Lear, Jr. | |
| 2016/0167802 A1 | 6/2016 | Lo et al. | |
| 2016/0208759 A1 | 7/2016 | Lo et al. | |
| 2016/0245144 A1 | 8/2016 | Selberg et al. | |
| 2016/0290214 A1 | 10/2016 | Ekanayake et al. | |
| 2016/0305440 A1* | 10/2016 | Laboda | B01D 19/0068 |
| 2016/0369700 A1 | 12/2016 | Ribarov et al. | |
| 2017/0030266 A1 | 2/2017 | Cerny et al. | |
| 2017/0096910 A1 | 4/2017 | Raimarckers et al. | |
| 2017/0113807 A1 | 4/2017 | Burnell et al. | |
| 2017/0114721 A1 | 4/2017 | Miller et al. | |
| 2017/0141419 A1 | 5/2017 | Wu et al. | |
| 2017/0159566 A1 | 6/2017 | Sennoun et al. | |
| 2017/0167382 A1 | 6/2017 | Miller et al. | |
| 2017/0291714 A1 | 10/2017 | Corman | |
| 2018/0016025 A1 | 1/2018 | Rheaume et al. | |

(56) References Cited

U.S. PATENT DOCUMENTS

| | | | |
|---|---|---|---|
| 2018/0056233 | A1 | 3/2018 | Henson et al. |
| 2018/0056234 | A1 | 3/2018 | Weng et al. |
| 2018/0071659 | A1 | 3/2018 | Rhoden |
| 2018/0118367 | A1 | 5/2018 | Rheaume et al. |
| 2019/0153952 | A1 | 5/2019 | Niergarth et al. |
| 2019/0153953 | A1 | 5/2019 | Niergarth et al. |
| 2019/0203644 | A1 | 7/2019 | Niergarth et al. |
| 2019/0218971 | A1 | 7/2019 | Niergarth et al. |
| 2020/0086239 | A1 | 3/2020 | Cordatos et al. |

FOREIGN PATENT DOCUMENTS

| | | |
|---|---|---|
| EP | 3075957 A1 | 10/2016 |
| EP | 3623030 A1 | 3/2020 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO 0238938 A1 | 5/2002 |
| WO | WO2006/079438 A1 | 8/2006 |
| WO | WO2011/038188 A1 | 3/2011 |

\* cited by examiner

FUEL OXYGEN CONVERSION UNIT WITH INTEGRATED WATER REMOVAL

FIELD OF THE INVENTION

The present subject matter relates generally to a fuel oxygen reduction unit for an engine and a method of operating the same.

BACKGROUND OF THE INVENTION

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a fuel delivery system for a gas turbine engine is provided. The fuel delivery system includes a fuel source; a draw pump downstream of the fuel source for generating a liquid fuel flow from the fuel source; a main fuel pump downstream of the draw pump; and a fuel oxygen reduction unit downstream of the draw pump and upstream of the main fuel pump. The fuel oxygen reduction unit includes a stripping gas line; a contactor in fluid communication with the stripping gas line and the draw pump for forming a fuel/gas mixture, wherein the contactor receives an inlet fuel flow from the draw pump; a separator in fluid communication with the contactor, the separator receives the fuel/gas mixture and separates the fuel/gas mixture into an outlet stripping gas flow and an outlet fuel flow at a location upstream of the main fuel pump; a catalyst disposed downstream of the separator, the catalyst receives and treats the outlet stripping gas flow, wherein a stripping gas stream flows out the catalyst; and a water removal component disposed between the catalyst and the contactor, wherein the water removal component removes water from the stripping gas stream.

In certain exemplary embodiments an inlet stripping gas flow exits the water removal component and flows to the contactor via the stripping gas line.

In certain exemplary embodiments the outlet fuel flow has a lower oxygen content than the inlet fuel flow.

In certain exemplary embodiments the outlet fuel flow has a higher pressure than the inlet fuel flow.

In certain exemplary embodiments the outlet stripping gas flow has a higher oxygen content than the inlet stripping gas flow.

In certain exemplary embodiments the catalyst removes oxygen from the outlet stripping gas flow by chemically converting the oxygen in the outlet stripping gas flow into a water vapor and a carbon dioxide in the stripping gas stream.

In certain exemplary embodiments the water removal component removes the water vapor from the stripping gas stream.

In certain exemplary embodiments the water removal component comprises a selectively permeable membrane that only removes the water from the stripping gas stream.

In certain exemplary embodiments the water removal component comprises a desiccant that absorbs the water from the stripping gas stream.

In certain exemplary embodiments the water removal component comprises a condenser.

In certain exemplary embodiments the fuel oxygen reduction unit recirculates a stripping gas.

In another exemplary embodiment of the present disclosure, a fuel delivery system for a gas turbine engine is provided. The fuel delivery system includes a fuel oxygen reduction unit that defines a stripping gas flowpath and includes an inlet fuel line and an outlet fuel line. The fuel oxygen reduction unit includes an oxygen transfer assembly for reducing an amount of oxygen in an inlet fuel flow through the inlet fuel line using a stripping gas flow through the stripping gas flowpath; a catalyst in airflow communication with the stripping gas flowpath at a location downstream of the oxygen transfer assembly, the catalyst receiving and treating the stripping gas flow in the stripping gas flowpath from the oxygen transfer assembly, wherein a stripping gas stream flows out the catalyst; and a water removal component disposed downstream of the catalyst, wherein the water removal component removes water from the stripping gas stream.

In certain exemplary embodiments the oxygen transfer assembly includes a contactor including a fuel inlet that receives the inlet fuel flow from the liquid fuel flowpath and a stripping gas inlet that receives an inlet stripping gas flow from the stripping gas flowpath, the contactor configured to form a fuel/gas mixture; and a separator including an inlet in fluid communication with the contactor that receives the fuel/gas mixture, a fuel outlet, and a stripping gas outlet, wherein the separator is configured to separate the fuel/gas mixture into an outlet stripping gas flow and an outlet fuel flow and provide the outlet stripping gas flow to the stripping gas flowpath through the stripping gas outlet and the outlet fuel flow to the outlet fuel line through the fuel outlet.

In certain exemplary embodiments the inlet stripping gas flow exits the water removal component and flows to the contactor via a stripping gas line.

In certain exemplary embodiments the outlet fuel flow has a lower oxygen content than the inlet fuel flow, and wherein the outlet stripping gas flow has a higher oxygen content than the inlet stripping gas flow.

In certain exemplary embodiments the catalyst removes oxygen from the stripping gas flow by chemically converting the oxygen in the outlet stripping gas flow into a water vapor and a carbon dioxide in the stripping gas stream.

In certain exemplary embodiments the water removal component removes the water vapor from the stripping gas stream.

In certain exemplary embodiments the water removal component comprises a selectively permeable membrane that removes the water from the stripping gas stream.

In certain exemplary embodiments the water removal component comprises a desiccant that absorbs the water from the stripping gas stream.

In certain exemplary embodiments the water removal component comprises a condenser.

In an exemplary aspect of the present disclosure, a method is provided for operating a fuel delivery system for a gas turbine engine. The method includes receiving an inlet fuel flow in an oxygen transfer assembly of a fuel oxygen reduction unit for reducing an amount of oxygen in the inlet fuel flow using a stripping gas flow through a stripping gas flowpath; separating a fuel/gas mixture into an outlet stripping gas flow and an outlet fuel flow; receiving the outlet stripping gas flow in a catalyst at a location downstream of the oxygen transfer assembly, the catalyst receiving and treating the outlet stripping gas flow from the oxygen transfer assembly, wherein a stripping gas stream flows out the catalyst; and removing water from the stripping gas stream downstream of the catalyst.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION OF THE INVENTION

Figure 1:
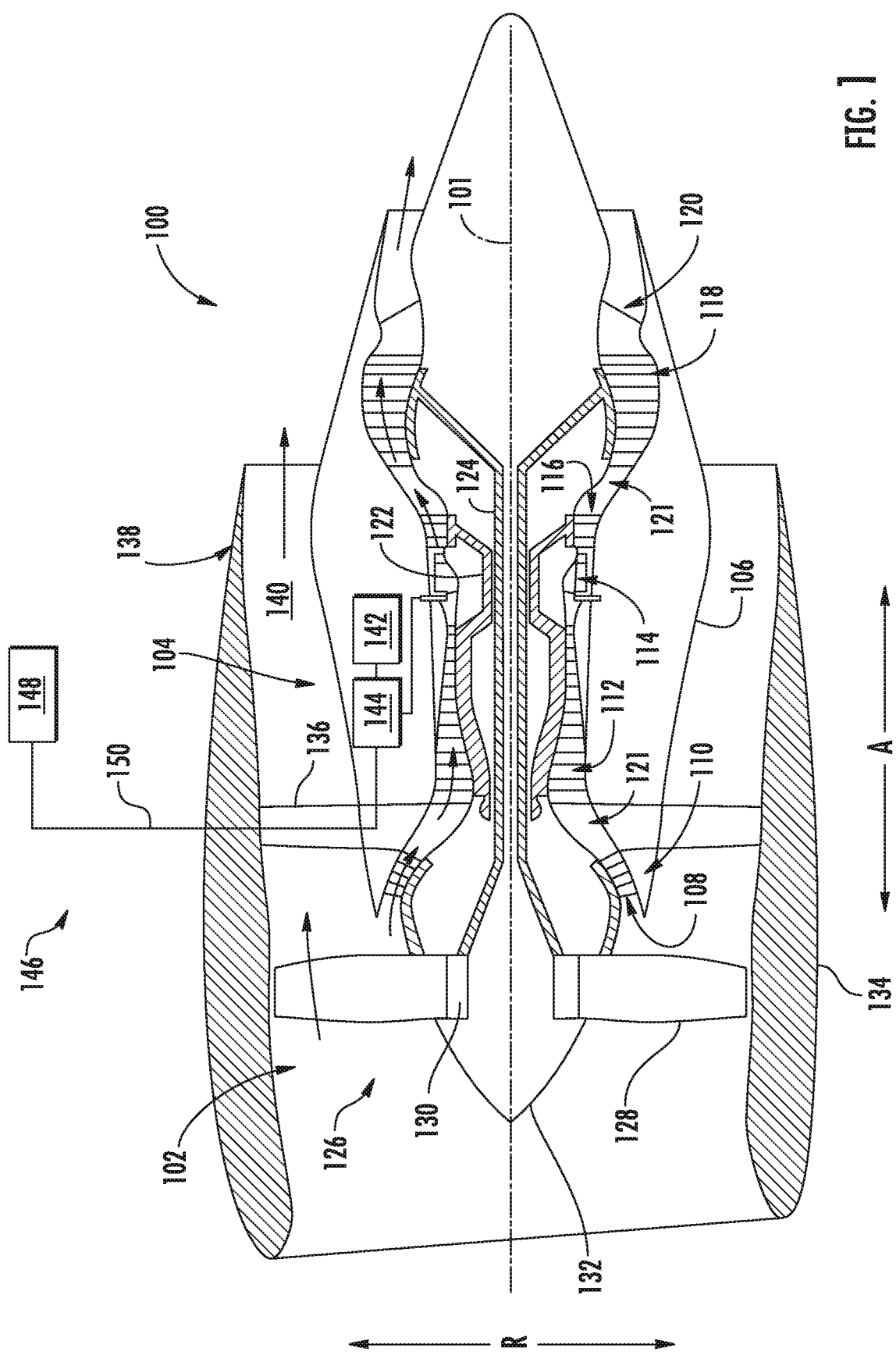
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In a fuel oxygen reduction unit, a catalyst receives and treats an outlet stripping gas flow that flows out of a separator to reduce an oxygen content of the stripping gas in order to reuse the stripping gas. In such a configuration, a byproduct may be produced, such as water. Advantageously, the present disclosure provides a system that includes a component, e.g., a water removal component, that removes water from a stripping gas stream after being treated by the catalyst prior to the stripping gas being reintroduced with an inlet fuel at a contactor in order to prevent an increase of water concentration in a fuel for an engine. Fuel systems can be sensitive to the amount of water present in the fuel. Thus, a fuel oxygen reduction unit including a water removal component of the present disclosure beneficially avoids the addition of such water into the fuel.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft.

For the embodiment depicted, the engine is configured as a high bypass turbofan engine 100. As shown in FIG. 1, the turbofan engine 100 defines an axial direction A (extending parallel to a longitudinal centerline or axis 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 101 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen reduction unit 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen reduction unit 144 is coupled to, or otherwise rotatable with, the accessory gearbox 142, although in other embodiments the fuel oxygen reduction unit 144 may use other, or additional sources, of rotary power such as an electric motor. In such a manner, it will be appreciated that the exemplary fuel oxygen reduction unit 144 is driven by the accessory gearbox 142. Notably, as used herein, the term "fuel oxygen conversion or reduction" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100. A more detailed schematic of a fuel delivery system in accordance with an exemplary embodiment of the present disclosure is provided below with reference to FIG. 7.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted, the turbofan engine 100 includes the fuel oxygen reduction unit 144 positioned within the turbomachine 104, i.e., within the casing 106 of the turbomachine 104, in other embodiments, the fuel oxygen reduction unit 144 may be positioned at any other suitable location. For example, in other embodiments, the fuel oxygen reduction unit 144 may instead be positioned remote from the turbofan engine 100. Additionally, in other embodiments, the fuel oxygen reduction unit 144 may additionally or alternatively be driven by other suitable power sources such as an electric motor, a hydraulic motor, or an independent mechanical coupling to the HP or LP shaft, etc.

Figure 2:
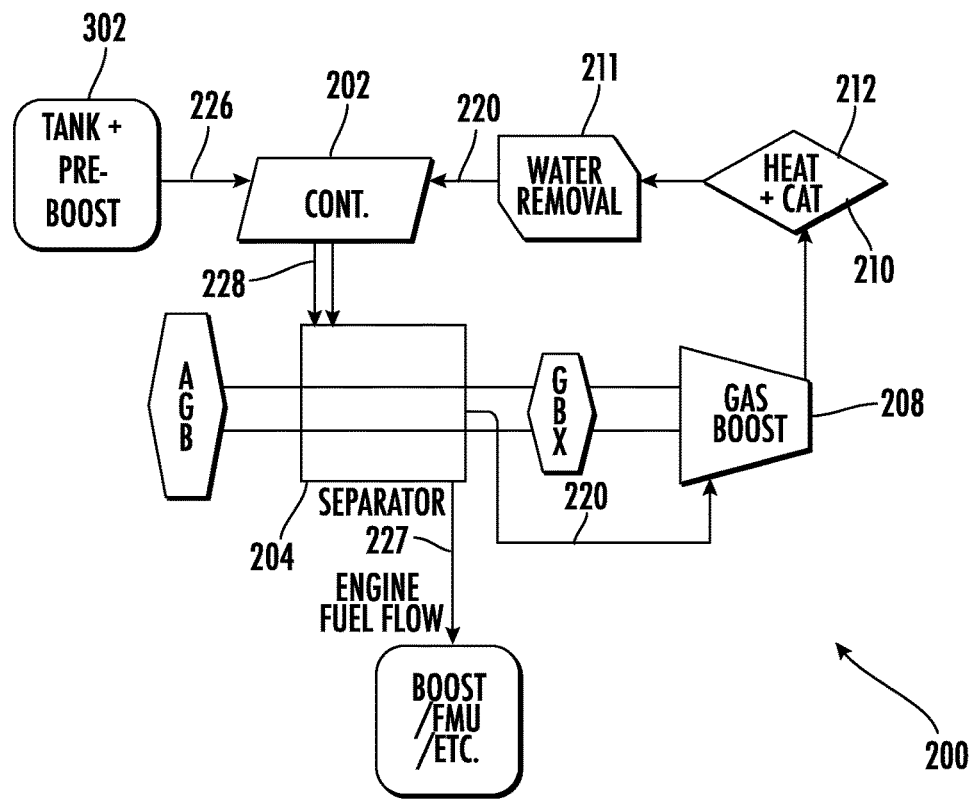
FIG. 2 is a schematic view of a fuel oxygen reduction unit in accordance with an exemplary embodiment of the present disclosure.
Figure 6:
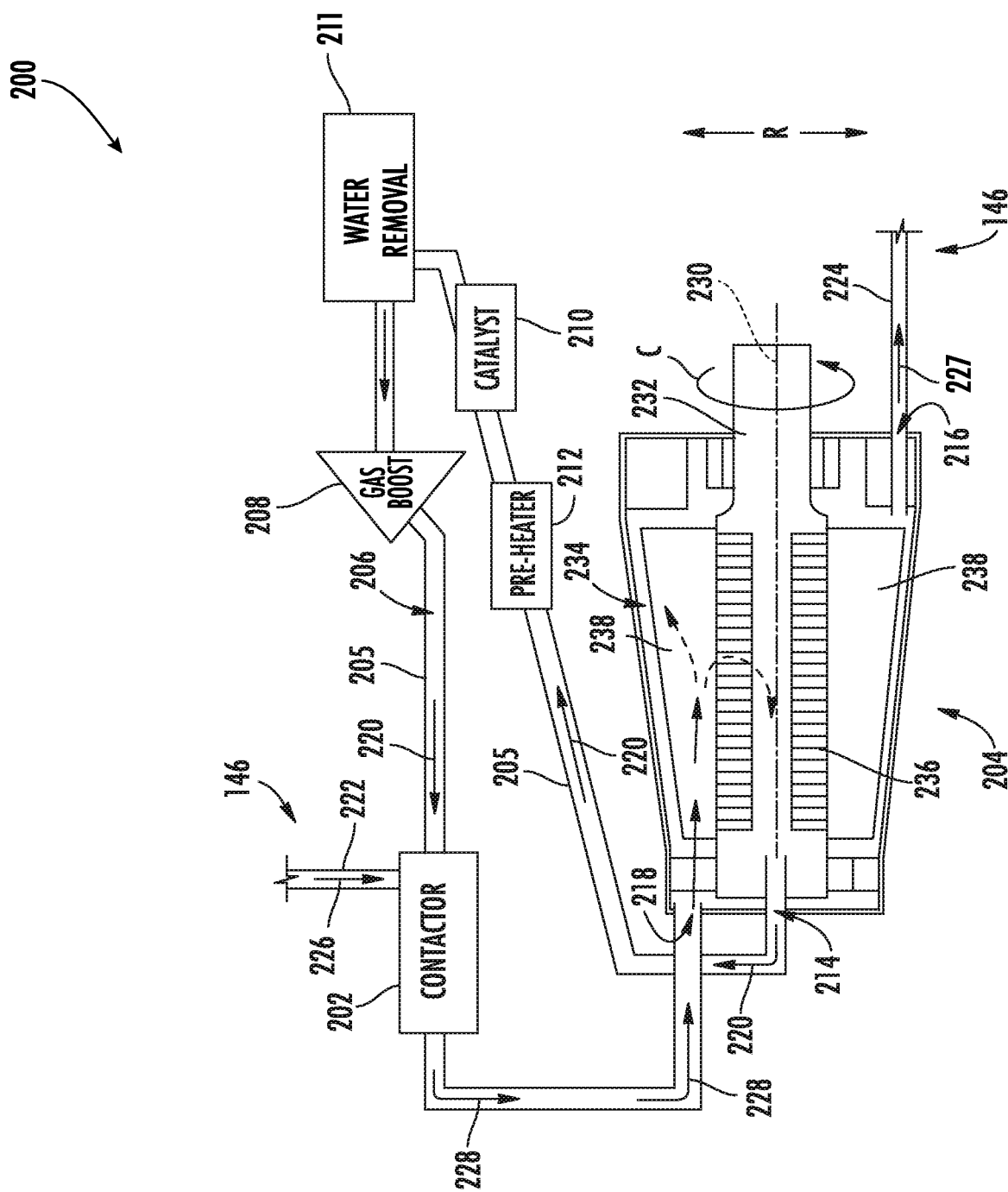
FIG. 6 is a schematic view of a fuel oxygen reduction unit in accordance with an exemplary embodiment of the present disclosure.

Referring now to FIGS. 2 and 6, schematic drawings of a fuel oxygen reduction unit or oxygen transfer assembly 200 for a gas turbine engine in accordance with an exemplary aspect of the present disclosure is provided. In at least certain exemplary embodiments, the exemplary fuel oxygen reduction unit 200 depicted may be incorporated into, e.g., the exemplary engine 100 described above with reference to FIG. 1 (e.g., may be the fuel oxygen reduction unit 144 depicted in FIG. 1 and described above).

As will be appreciated from the discussion herein, in an exemplary embodiment, the fuel oxygen reduction unit 200 generally includes a contactor 202, a separator 204, a catalyst 210, and a water removal component 211. In one exemplary embodiment, the separator 204 may be a dual separator pump as described in more detail below and as shown in FIG. 6. In other exemplary embodiments, other separators may be utilized with the fuel oxygen reduction unit 200 of the present disclosure. In other exemplary embodiments, the oxygen transfer assembly 200 may include a membrane meant to filter or suck out the oxygen from the fuel into the stripping gas, or chemically react with the oxygen in the fuel to reduce the oxygen in the fuel. In such embodiments, the oxygen transfer assembly 200 may not include a contactor and a separator.

In fuel oxygen reduction unit 200, the catalyst 210 receives and treats an outlet stripping gas flow 220 that flows out of the separator 204 to reduce an oxygen content of the stripping gas 220 in order to reuse the stripping gas 220. In such a configuration, a byproduct may be produced, such as water. Advantageously, the present disclosure provides a system that includes a component, e.g., the water removal component 211, that removes water from a stripping gas stream 220 after being treated by the catalyst 210 prior to the stripping gas 220 being reintroduced with an inlet fuel 226 at the contactor 202 in order to prevent an increase of water concentration in a fuel for an engine. Fuel systems can be sensitive to the amount of water present in the fuel. Thus, a fuel oxygen reduction unit 200 including a water removal component 211 of the present disclosure beneficially avoids the addition of such water into the fuel.

The exemplary contactor 202 depicted may be configured in any suitable manner to substantially mix a received gas and liquid flow, as will be described below. For example, the contactor 202 may, in certain embodiments be a mechanically driven contactor (e.g., having paddles for mixing the received flows), or alternatively may be a passive contactor for mixing the received flows using, at least in part, a pressure and/or flowrate of the received flows. For example, a passive contactor may include one or more turbulators, a venturi mixer, etc.

Moreover, the exemplary fuel oxygen reduction unit 200 includes a stripping gas line 205, and more particularly, includes a plurality of stripping gas lines 205, which together at least in part define a circulation gas flowpath 206 extending from the separator 204 to the contactor 202. In certain exemplary embodiments, the circulation gas flowpath 206 may be formed of any combination of one or more conduits, tubes, pipes, etc. in addition to the plurality stripping gas lines 205 and structures or components within the circulation gas flowpath 206.

As will be explained in greater detail, below, the fuel oxygen reduction unit 200 generally provides for a flow of stripping gas 220 through the plurality of stripping gas lines 205 and stripping gas flowpath 206 during operation. It will be appreciated that the term "stripping gas" is used herein as a term of convenience to refer to a gas generally capable of performing the functions described herein. The stripping gas 220 flowing through the stripping gas flowpath/circulation gas flowpath 206 may be an actual stripping gas functioning to strip oxygen from the fuel within the contactor, or alternatively may be a sparging gas bubbled through a liquid fuel to reduce an oxygen content of such fuel. For example, as will be discussed in greater detail below, the stripping gas 220 may be an inert gas, such as Nitrogen or Carbon Dioxide ($CO_2$), a gas mixture made up of at least 50% by mass inert gas, or some other gas or gas mixture having a relatively low oxygen content.

Moreover, for the exemplary oxygen reduction unit depicted, the fuel oxygen reduction unit 200 further includes a gas boost pump 208, a catalyst 210, a water removal component 211, and a pre-heater 212. For the embodiment shown, the gas boost pump 208, the catalyst 210, the pre-heater 212, and the water removal component 211 are each arranged within the circulation gas flowpath 206 in series flow.

The gas boost pump 208, the catalyst 210, the pre-heater 212, and the water removal component 211 may be arranged in different configurations within the circulation gas flowpath 206.

For example, referring to FIG. 2, in a first exemplary embodiment, the arrangement includes the gas boost pump 208, the catalyst 210 and the pre-heater 212, and the water removal component 211 in a series flow. Thus, a flow of the stripping gas 220 exits the stripping gas outlet 214 of the separator 204 and then flows through the gas boost pump 208, the catalyst 210 and the pre-heater 212, and the water removal component 211 in a series flow. Next, the resulting relatively low oxygen content stripping gas, with water removed from the stripping gas stream 220, is then provided through the remainder of the circulation gas flowpath 206 and back to the contactor 202, such that the cycle may be repeated.

Figure 3:
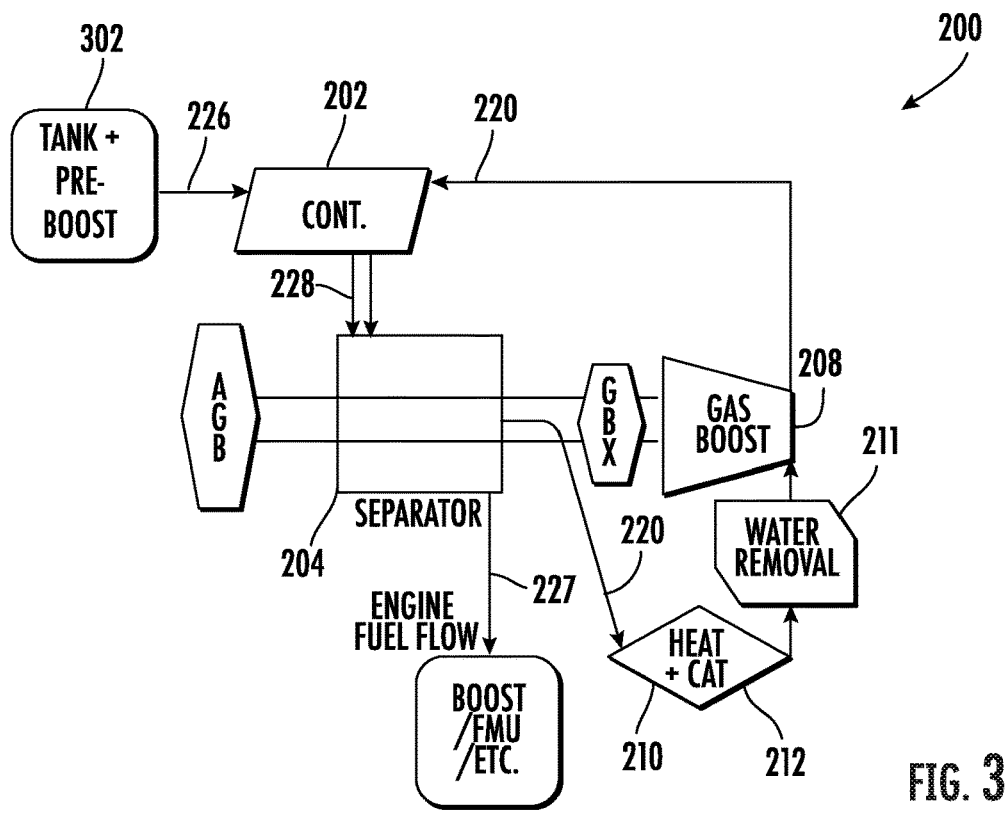
FIG. 3 is a schematic view of a fuel oxygen reduction unit in accordance with another exemplary embodiment of the present disclosure.

Referring to FIGS. 3 and 6, in a second exemplary embodiment, the arrangement includes the pre-heater 212 and the catalyst 210, the water removal component 211, and the gas boost pump 208 in a series flow. Thus, a flow of the stripping gas 220 exits the stripping gas outlet 214 of the separator 204 and then flows through the catalyst 210 and the pre-heater 212, the water removal component 211, and the gas boost pump 208 in a series flow. Next, the resulting relatively low oxygen content stripping gas, with water removed from the stripping gas stream 220, is then provided through the remainder of the circulation gas flowpath 206 and back to the contactor 202, such that the cycle may be repeated.

Figure 4:
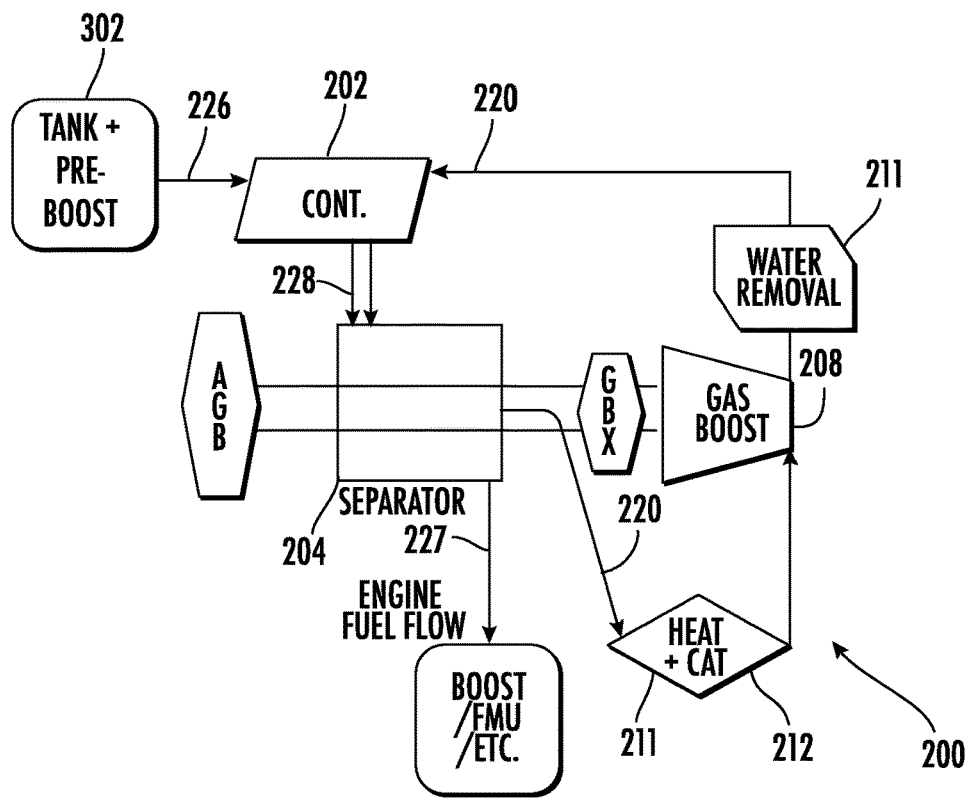
FIG. 4 is a schematic view of a fuel oxygen reduction unit in accordance with another exemplary embodiment of the present disclosure.

Referring to FIG. 4, in a third exemplary embodiment, the arrangement includes the catalyst 210 and the pre-heater 212, the gas boost pump 208, and the water removal component 211 in a series flow. Thus, a flow of the stripping gas 220 exits the stripping gas outlet 214 of the separator 204 and then flows through the catalyst 210 and the pre-heater 212, the gas boost pump 208, and the water removal component 211 in a series flow. Next, the resulting relatively low oxygen content stripping gas, with water removed from the stripping gas stream 220, is then provided through the remainder of the circulation gas flowpath 206 and back to the contactor 202, such that the cycle may be repeated.

Additionally, the gas boost pump 208 may be configured as a rotary gas pump coupled to, and driven by, a power source as shown in FIGS. 2-4. In certain embodiments, the power source for the gas boost pump 208 may be the same power source for the separator 204 (discussed below), or alternatively, may be any other suitable power source. For example, in certain embodiments, the gas boost pump 208 and/or separator 204 may be coupled to an accessory gearbox 142, other gearbox, or a suitable electrical power source, such as a permanent magnet alternator (PMA) that may also serve to provide power to a full authority digital control engine controller (FADEC).

In an exemplary embodiment using a permanent magnet alternator (PMA) as a power source for a gas boost pump 208 and/or separator 204, a full authority digital control engine controller (FADEC) is powered by a dedicated PMA, which is in turn rotated by/driven by an accessory gearbox of a gas turbine engine. The PMA is therefore sized to be capable of providing a sufficient amount of electrical power to the FADEC during substantially all operating conditions, including relatively low-speed operating conditions, such as start-up and idle. As the engine comes up to speed, however, the PMA may generate an increased amount electric power, while an amount of electric power required to operate the FADEC may remain relatively constant. Accordingly, as the engine comes up to speed the PMA may generate an amount of excess electric power that may need to be dissipated through an electrical sink.

The inventors of the present disclosure have found that a power consumption need for a fuel oxygen reduction unit may complement the power generation of the PMA. More specifically, the fuel oxygen reduction unit may need a relatively low amount of electric power during low rotational speeds of the gas turbine engine (when the PMA is not creating much excess electrical power), and a relatively high amount of electric power during high rotational speeds of the gas turbine engine (when the PMA is creating excess electrical power). Accordingly, by using the PMA to power the fuel oxygen reduction unit, the electrical power generated by the PMA may be more efficiently utilized.

It will be appreciated, however, that such a configuration is by way of example only, and in other embodiments the FADEC may be any other suitable engine controller, the PMA may be any other suitable electric machine, etc. Accordingly, in certain embodiments, an engine system is provided for an aircraft having an engine and an engine controller. The engine system includes an electric machine configured to be in electrical communication with the engine controller for powering the engine controller; and a fuel oxygen reduction unit defining a liquid fuel flowpath and a stripping gas flowpath and configured to transfer an oxygen content of a fuel flow through the liquid fuel flowpath to a stripping gas flow through the stripping gas flowpath, the fuel oxygen reduction unit also in electrical communication with the electric machine such that the electric machine powers at least in part the fuel oxygen reduction unit.

Referring to FIG. 6, in an exemplary embodiment, the separator 204 generally includes a stripping gas outlet 214, a fuel outlet 216, and an inlet 218. It will also be appreciated that the exemplary fuel oxygen reduction unit 200 depicted is operable with a fuel delivery system 146, such as a fuel delivery system 146 of the gas turbine engine including the fuel oxygen reduction unit 200 (see, e.g., FIG. 1). The exemplary fuel delivery system 146 generally includes a plurality of fuel lines, and in particular, an inlet fuel line 222 and an outlet fuel line 224. The inlet fuel line 222 is fluidly connected to the contactor 202 for providing a flow of liquid fuel or inlet fuel flow 226 to the contactor 202 (e.g., from a fuel source, such as a fuel tank) and the outlet fuel line 224 is fluidly connected to the fuel outlet 216 of the dual separator pump 204 for receiving a flow of deoxygenated liquid fuel or outlet fuel flow 227.

Moreover, during typical operations, a flow of stripping gas 220 flows through the circulation gas flowpath 206 from the stripping gas outlet 214 of the separator 204 to the contactor 202. More specifically, during typical operations, stripping gas 220 flows from the stripping gas outlet 214 of the separator 204, through the pre-heater 212 (configured to add heat energy to the gas flowing therethrough), through the catalyst 210, through the water removal component 211, and to/through the gas boost pump 208, wherein a pressure of the stripping gas 220 is increased to provide for the flow of the stripping gas 220 through the circulation gas flowpath 206. The relatively high pressure stripping gas 220 (i.e., relative to a pressure upstream of the boost pump 208 and the fuel entering the contactor 202), with water removed from the stripping gas stream 220 by the water removal component 211, is then provided to the contactor 202, wherein the stripping gas 220 is mixed with the flow of inlet fuel 226 from the inlet fuel line 222 to generate a fuel gas mixture 228. The fuel gas mixture 228 generated within the contactor 202 is provided to the inlet 218 of the separator 204.

Generally, it will be appreciated that during operation of the fuel oxygen reduction unit 200, the inlet fuel 226 provided through the inlet fuel line 222 to the contactor 202 may have a relatively high oxygen content. The stripping gas 220 provided to the contactor 202 may have a relatively low oxygen content or other specific chemical structure. Within the contactor 202, the inlet fuel 226 is mixed with the stripping gas 220, resulting in the fuel gas mixture 228. As a result of such mixing a physical exchange may occur whereby at least a portion of the oxygen within the inlet fuel 226 is transferred to the stripping gas 220, such that the fuel component of the mixture 228 has a relatively low oxygen content (as compared to the inlet fuel 226 provided through inlet fuel line 222) and the stripping gas component of the mixture 228 has a relatively high oxygen content (as compared to the inlet stripping gas 220 provided through the circulation gas flowpath 206 to the contactor 202).

Within the separator 204 the relatively high oxygen content stripping gas 220 is then separated from the relatively low oxygen content fuel 226 back into respective flows of an outlet stripping gas 220 and outlet fuel 227.

In one exemplary embodiment, the separator 204 may be a dual separator pump as shown in FIG. 6. For example, the dual separator pump 204 defines a central axis 230, radial direction R, and a circumferential direction C extending about the central axis 230. Additionally, the dual separator pump 204 is configured as a mechanically-driven dual separator pump, or more specifically as a rotary/centrifugal dual separator pump. Accordingly, the dual separator pump 204 includes an input shaft 232 and a single-stage separator/pump assembly 234. The input shaft 232 is mechanically coupled to the single-stage separator/pump assembly 234, and the two components are together rotatable about the central axis 230. Further, the input shaft 232 may be mechanically coupled to, and driven by, e.g., an accessory gearbox (such as the exemplary accessory gearbox 142 of FIG. 1). However, in other embodiments, the input shaft 232 may be mechanically coupled to any other suitable power source, such as an electric motor. As will be appreciated, the single-stage separator/pump assembly 234 may simultaneously separate the mixture 228 into flows of an outlet stripping gas 220 and outlet fuel 227 from the mixture 228 and increase a pressure of the separated outlet fuel 227 (as will be discussed in greater detail below).

Additionally, the exemplary single-stage separator/pump assembly 234 depicted generally includes an inner gas filter 236 arranged along the central axis 230, and a plurality of paddles 238 positioned outward of the inner gas filter 236 along the radial direction R. During operation, a rotation of the single-stage separator/pump assembly 234 about the central axis 230, and more specifically, a rotation of the plurality of paddles 238 about the central axis 230 (i.e., in the circumferential direction C), may generally force heavier liquid fuel 226 outward along the radial direction R and lighter stripping gas 220 inward along the radial direction R through the inner gas filter 236. In such a manner, the outlet fuel 227 may exit through the fuel outlet 216 of the dual separator pump 204 and the outlet stripping gas 220 may exit through the gas outlet 214 of the dual separator pump 204, as is indicated.

Further, it will be appreciated that with such a configuration, the outlet fuel 227 exiting the dual separator pump 204 through the fuel outlet 216 may be at a higher pressure than the inlet fuel 226 provided through inlet fuel line 222, and further higher than the fuel/gas mixture 228 provided through the inlet 218. Such may be due at least in part to the centrifugal force exerted on such liquid fuel 226 and the rotation of the plurality of paddles 238. Additionally, it will be appreciated that for the embodiment depicted, the liquid fuel outlet 216 is positioned outward of the inlet 218 (i.e., the fuel gas mixture inlet) along the radial direction R. Such may also assist with the increasing of the pressure of the outlet fuel 227 provided through the fuel outlet 216 of the separator 204.

For example, it will be appreciated that with such an exemplary embodiment, the separator 204 of the fuel oxygen reduction unit 200 may generate a pressure rise in the fuel flow during operation. As used herein, the term "pressure rise" refers to a net pressure differential between a pressure of the flow of outlet fuel 227 provided to the fuel outlet 216 of the separator 204 (i.e., a "liquid fuel outlet pressure") and a pressure of the inlet fuel 226 provided through the inlet fuel line 222 to the contactor 202. In at least certain exemplary embodiments, the pressure rise of the liquid fuel 226 may be at least about sixty (60) pounds per square inch ("psi"), such as at least about ninety (90) psi, such as at least about one hundred (100) psi, such as up to about seven hundred and fifty (750) psi. With such a configuration, it will be appreciated that in at least certain exemplary embodiments of the present disclosure, the liquid fuel outlet pressure may be at least about seventy (70) psi during operation. For example, in at least certain exemplary embodiments, the liquid fuel out of pressure may be at least about one hundred (100) psi during operation, such as at least about one hundred and twenty-five (125) psi during operation, such as up to about eight hundred (800) psi during operation. Additional details about these dual functions of the separator 204 will be discussed below with reference to FIG. 7.

Further, it will be appreciated that the outlet fuel 227 provided to the fuel outlet 216, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the outlet fuel 227 provided to the fuel outlet 216 may have an oxygen content of less than about five (5) parts per million ("ppm"), such as less than about three (3) ppm, such as less than about two (2) ppm, such as less than about one (1) ppm, such as less than about 0.5 ppm.

Moreover, as will be appreciated, the exemplary fuel oxygen reduction unit 200 depicted recirculates and reuses the stripping gas 220 (i.e., the stripping gas 220 operates in a substantially closed loop). However, the stripping gas 220 exiting the separator 204, having interacted with the liquid fuel 226, has a relatively high oxygen content. Accordingly, in order to reuse the stripping gas 220, an oxygen content of the stripping gas 220 from the outlet 214 of the separator 204 needs to be reduced. For the embodiment depicted, and as noted above, the stripping gas 220 flows through the preheater 212, through the catalyst 210 where the oxygen content of the stripping gas 220 is reduced, and through the water removal component 211 where water is removed from the stripping gas stream 220. More specifically, within the catalyst 210 the relatively oxygen-rich stripping gas 220 is reacted to reduce the oxygen content thereof. It will be appreciated that catalyst 210 may be configured in any suitable manner to perform such functions. For example, in certain embodiments, the catalyst 210 may be configured to combust the relatively oxygen-rich stripping gas 220 to reduce an oxygen content thereof. However, in other embodiments, the catalyst 210 may additionally, or alternatively, include geometries of catalytic components through which the relatively oxygen-rich stripping gas 220 flows to reduce an oxygen content thereof. In one or more of these embodiments, the catalyst 210 may be configured to reduce an oxygen content of the stripping gas 220 to less than about five percent (5%) oxygen ($O_2$) by mass, such less than about two (2) percent (3%) oxygen ($O_2$) by mass, such less than about one percent (1%) oxygen ($O_2$) by mass.

In one or more of these configurations, a byproduct may be produced, such as water, which is removed utilizing the water removal component 211. Advantageously, the present disclosure provides a system that includes components which remove water from a stripping gas stream 220 after being treated by the catalyst 210 prior to the stripping gas 220 being reintroduced with an inlet fuel 226 at the contactor 202 in order to prevent an increase of water concentration in a fuel for an engine. Fuel systems can be sensitive to the amount of water present in the fuel. Thus, a fuel oxygen reduction unit 200 including a water removal component 211 of the present disclosure beneficially avoids the addition of such water into the fuel.

As described herein, a catalyst 210 is disposed downstream of the separator 204 and the catalyst 210 receives and treats the outlet stripping gas flow 220 that flows out the stripping gas outlet 214 of the separator 204. In an exemplary embodiment, the catalyst 210 removes oxygen from the outlet stripping gas flow 220 by chemically converting the oxygen in the outlet stripping gas flow 220 into a water vapor and a carbon dioxide in the stripping gas stream 220. Next, a stripping gas stream 220 flows out of the catalyst 210 and to the water removal component 211 of the present disclosure.

In an exemplary embodiment of the present disclosure, the water removal component 211 is disposed between the catalyst 210 and the contactor 202. Advantageously, the water removal component 211 removes water from the stripping gas stream 220 that flows from the catalyst 210. For example, the water removal component 211 removes water vapor from the stripping gas stream 220.

In a first exemplary embodiment, the water removal component 211 may comprise a selectively permeable membrane. In one embodiment, the selectively permeable membrane is configured to only remove water molecules from a stripping gas stream 220 after being treated by the catalyst 210.

In a second exemplary embodiment, the water removal component 211 may comprise a desiccant. In one embodiment, the desiccant absorbs water molecules from a stripping gas stream 220 after being treated by the catalyst 210. In such an embodiment, the desiccant may be refreshed or replaced as needed. In an exemplary embodiment, the desiccant may include a bead system that selectively draws the water molecules out of a stripping gas stream 220 after being treated by the catalyst 210.

In a third exemplary embodiment, the water removal component 211 may comprise a condenser. In one embodiment, the condenser is configured to reduce a temperature of the gas stream to below a condensation point. In this manner, water and other vapors may be removed from a stripping gas stream 220 after being treated by the catalyst 210 and used for other purposes or discarded.

In other exemplary embodiments, the water removal component 211 may comprise other devices, systems, or components that remove water from a stripping gas stream 220 after being treated by the catalyst 210.

The resulting relatively low oxygen content gas, with water removed from the stripping gas stream 220, is then provided through the remainder of the circulation gas flowpath 206 and back to the contactor 202, such that the cycle may be repeated. In such a manner, it will be appreciated that the stripping gas 220 may be any suitable gas capable of undergoing the chemical transitions described above. For example, the stripping gas may be air from, e.g., a core air flowpath of a gas turbine engine including the fuel oxygen reduction unit 200 (e.g., compressed air bled from an HP compressor 112; see FIG. 1). However, in other embodiments, the stripping gas may instead be any other suitable gas, such as an inert gas, such as Nitrogen or Carbon Dioxide ($CO_2$), a gas mixture made up of at least 50% by mass inert gas, or some other gas or gas mixture having a relatively low oxygen content.

It will be appreciated, however, that the exemplary fuel oxygen reduction unit 200 described above is provided by way of example only. In other embodiments, the fuel oxygen reduction unit 200 may be configured in any other suitable manner.

In other embodiments, the stripping gas 220 may not flow through a circulation gas flowpath 206, and instead the fuel oxygen reduction unit 200 may include an open loop stripping gas flowpath, with such flowpath in flow communication with a suitable stripping gas source, such as a bleed air source, and configured to dump such air to the atmosphere downstream of the fuel gas separator 204.

Figure 5:
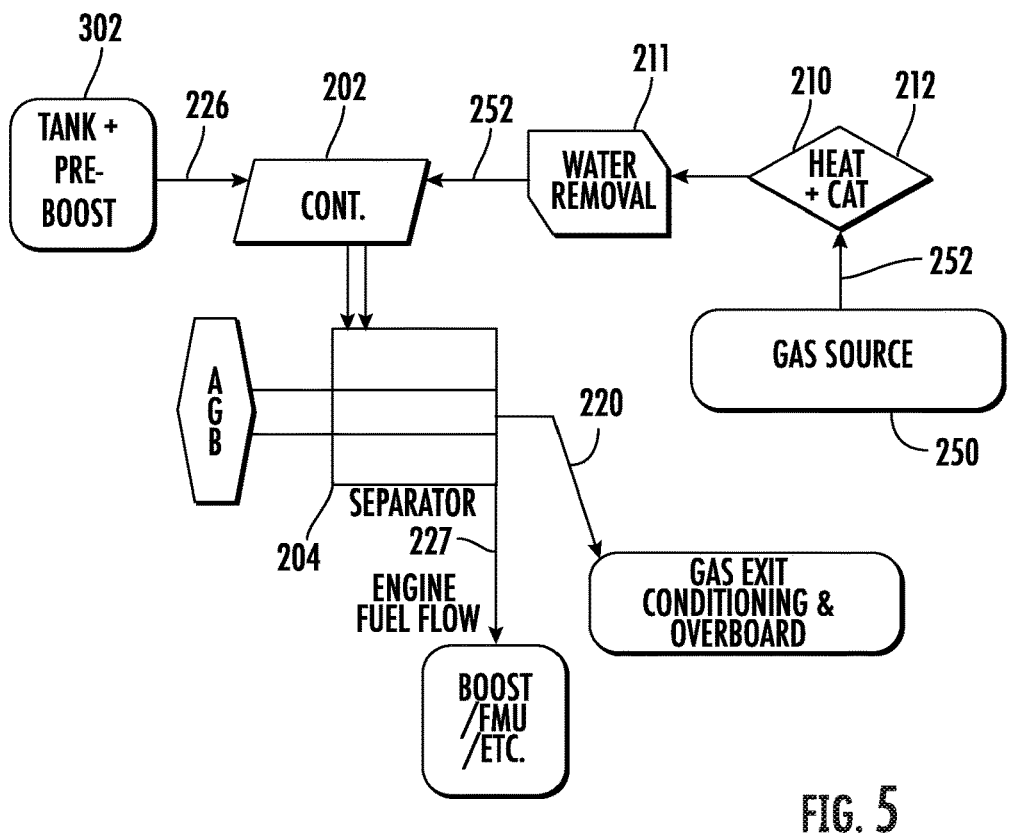
FIG. 5 is a schematic view of a fuel oxygen reduction unit in accordance with another exemplary embodiment of the present disclosure.

For example, referring to FIG. 5, in another exemplary embodiment of the present disclosure, the fuel oxygen reduction unit 200 with water removal component 211 may be part of a single-pass stripping gas system. For example, a gas source or stripping gas source 250 may provide an inlet stripping gas flow 252 to the contactor 202. As described herein, before the stripping gas flow 252 reaches the contactor 202, the stripping gas flow 252 is first treated. For example, the stripping gas flow 252 first flows through the catalyst 210 and the pre-heater 212, and then the water removal component 211. In the single-pass stripping gas system shown in FIG. 5, a stripping gas flow 220 exiting the separator 204 is not recirculated though the system.

Figure 7:
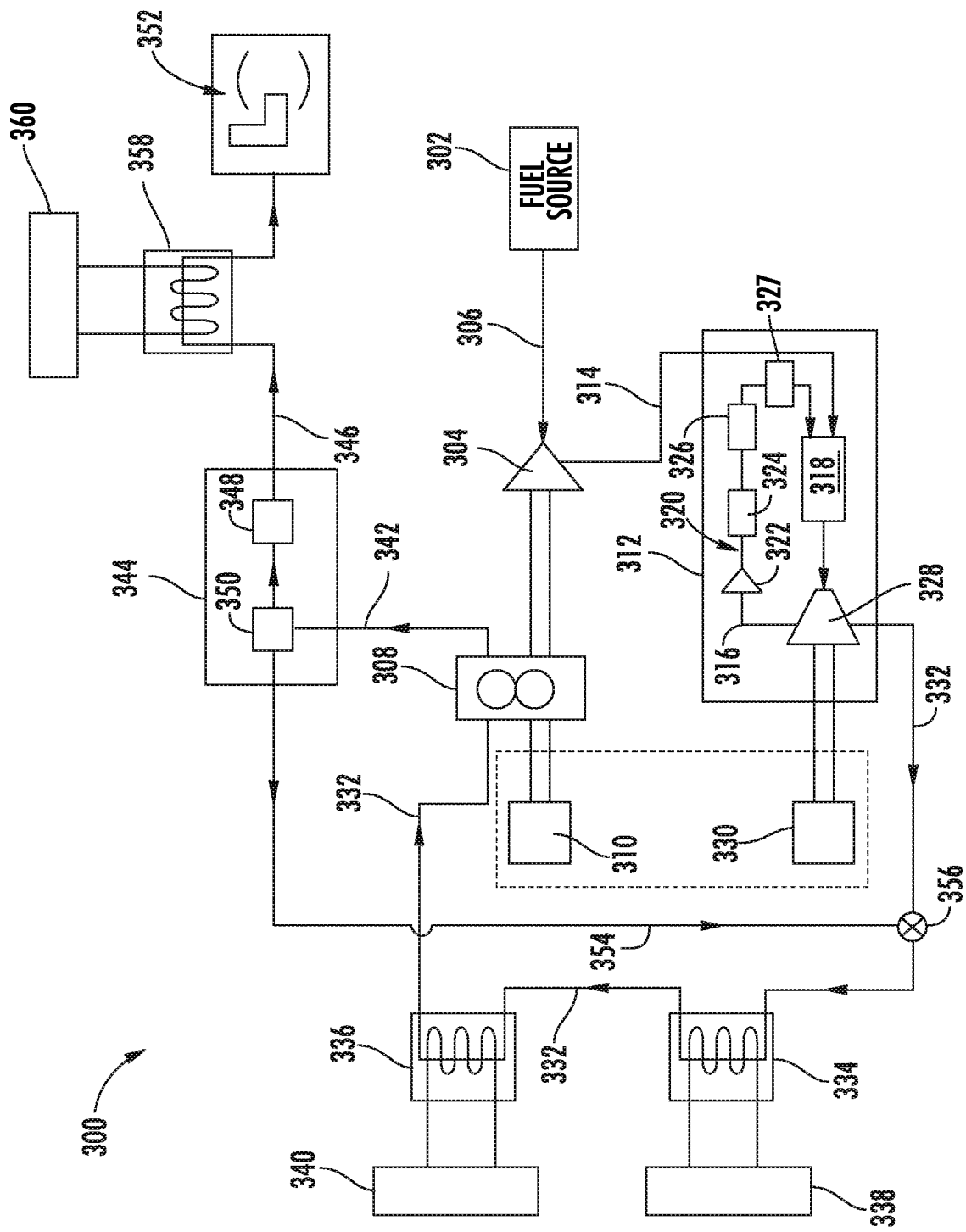
FIG. 7 is a schematic view of a fuel delivery system incorporating a fuel oxygen reduction unit in accordance with an exemplary embodiment of the present disclosure.

Referring now to FIG. 7, a schematic diagram is provided of a fuel delivery system 300 for a gas turbine engine in accordance with an exemplary embodiment of the present disclosure. In certain exemplary embodiments, the exemplary fuel delivery system 300 depicted in FIG. 7 may be utilized with the exemplary gas turbine engine described above with reference to FIG. 1 (i.e., configured as the exemplary fuel delivery system 146, operable with the exemplary turbofan engine 100), and/or may be configured as the exemplary fuel oxygen reduction unit 200 described above with reference to FIGS. 2 and 6. However, in other embodiments, the fuel delivery system 300 may be utilized with any other suitable gas turbine engine, vehicle (including, e.g., an aircraft), etc.

As is depicted, the fuel delivery system 300 generally includes a fuel source 302, a draw pump 304, and a first fuel line 306 extending between the fuel source 302 and the draw pump 304. The draw pump 304 may refer to the first pump located downstream of the fuel source 302 for generating a fuel flow from the fuel source 302. Accordingly, the draw pump 304 depicted is positioned downstream of the fuel source 302 for generating a flow of liquid fuel through the first fuel line 306 from the fuel source 302 (note that fuel flow directions through the fuel delivery system of FIG. 7 are indicated schematically as arrows on the respective fuel lines). When the exemplary fuel delivery system 300 is utilized with a gas turbine engine of an aircraft, the fuel source 302 may be a fuel tank, for example, a fuel tank positioned within one of the wings of the aircraft, within a fuselage of the aircraft, or any other suitable location.

The fuel delivery system 300 further includes, as will be discussed in greater detail below, a main fuel pump 308 positioned downstream of the draw pump 304. The main fuel pump 308 may refer to a fuel pump for providing pressurized fuel flow to the components for combusting such fuel (i.e., providing the last pressure rise upstream of such components combusting the fuel, as will be described in more detail below). For the embodiment depicted, the main fuel pump 308 is mechanically coupled to a first power source 310, and the draw pump 304 is mechanically coupled to and rotatable with the main fuel pump 308. In such a manner, the main fuel pump 308 and the draw pump 304 may share the first power source 310. For example, in certain embodiments, the first power source 310 may be a first pad of an accessory gearbox of the gas turbine engine (see, e.g. accessory gearbox 142 of FIG. 1). However, in other embodiments, the draw pump 304 may be powered by an independent power source relative to the main fuel pump 308. Further, in other embodiments, one or both of the draw pump 304 and main fuel pump 308 may be powered by any other suitable power source.

The exemplary fuel system of FIG. 7 further includes a fuel oxygen reduction unit 312 and a second fuel line 314. The fuel oxygen reduction unit 312 generally includes a stripping gas line 316 and a contactor 318. More specifically, the fuel oxygen reduction unit 312 defines a circulation gas flowpath 320, with the stripping gas line 316 defining at least in part the circulation gas flowpath 320. The contactor 318 is in fluid communication with the stripping gas line 316 (and circulation gas flowpath 320) and the draw pump 304 (through the second fuel line 314 for the embodiment shown) for forming a fuel/gas mixture. Notably, for the embodiment depicted, the exemplary fuel oxygen reduction unit 312 further includes a gas boost pump 322, a pre-heater 324, a catalyst 326, and a water removal component 327, each arranged in series within the circulation gas flowpath 320. These components may be configured to provide the stripping gas through the circulation gas flowpath 320 and stripping gas line 316 with the desired properties to mix with the with fuel within the contactor 318 to reduce an oxygen content of the fuel and to remove water from a stripping gas stream.

Further, the exemplary fuel oxygen reduction unit 312 further includes a separator 328 in fluid communication with the contactor 318 for receiving the fuel/gas mixture from the contactor 318 and separating the fuel/gas mixture into an outlet stripping gas flow and an outlet fuel flow at a location upstream of the main fuel pump 308. Notably, the fuel oxygen reduction unit 312 and exemplary separator 328 of FIG. 7 may be configured in substantially the same manner as the exemplary fuel oxygen reduction unit 200 and separator 204 described above with reference to FIGS. 2 and 6. In such a manner, it will be appreciated that the separator 328 may be a mechanically-driven dual separator pump 328 coupled to a second power source 330. For the embodiment of FIG. 7, the second power source 330 may be a second pad of an accessory gearbox. In such a manner, the separator 328 and main fuel pump 308 (as well as the draw pump 304 for the embodiment shown) may each be driven by, e.g., an accessory gearbox. However, it will be appreciated, that for the embodiment depicted the main fuel pump 308 and separator 328 may be coupled to different pads of the accessory gearbox, such that they may be rotated at different rotational speeds.

It will be appreciated, however, that in other exemplary embodiments, the fuel oxygen reduction unit 312 may have any other suitable configuration. For example, in other embodiments, the fuel oxygen reduction unit 312 may have any other suitable separator 328, may have its components arranged in any other suitable flow order, may not include each of the components depicted, may include components configured in any other suitable manner, or may include other components not depicted or described herein.

Referring still to the embodiment of FIG. 7, as with the exemplary separator 204 described above with reference to FIGS. 2 and 6, the separator 328 depicted in FIG. 7 is further configured to generate a pressure rise in the fuel flow of least about sixty (60) psi, such as at least ninety (90) psi and up to about seven hundred and fifty (750) psi. In such a manner, a liquid fuel outlet pressure generated by the separator 328 may be at least about seventy (70) psi, or greater. Such may be accomplished in certain exemplary embodiments through a single stage separator/pump assembly (see, e.g., assembly 234 of FIG. 6).

With such an increase in pressure in the outlet fuel flow through the separator 328 of the fuel oxygen reduction unit 312, the separator 328 of the fuel oxygen reduction unit 312 depicted may provide substantially all of a necessary pressure rise of the fuel flow within the fuel delivery system 300 downstream of the draw pump 304 and upstream of the main fuel pump 308. Such is the case with the exemplary fuel delivery system 300 depicted in FIG. 7. Accordingly, for the exemplary embodiment depicted, the separator 328 of the fuel oxygen reduction unit 312 effectively obviates a need for including a separate booster pump for the fuel flow through the fuel delivery system 300 downstream of the draw pump 304 and upstream of the main fuel pump 308. Such may reduce a cost and weight of the fuel delivery system 300.

In such a manner, it will further be appreciated that for the embodiment shown in FIG. 7, substantially all of the fuel flow from the draw pump 304 to the main fuel pump 308 flows through the separator 328 of the fuel oxygen reduction unit 312. More specifically, for the exemplary embodiment depicted, substantially all of the fuel flow from the draw pump 304 to the main fuel pump 308 flows through the separator 328 of the fuel oxygen reduction unit 312 without option for bypass (i.e., no bypass lines around the separator 328 for the embodiment shown). Such may therefore ensure that the separator 328 of the fuel oxygen reduction unit 312 may provide a desired amount of pressure rise in the fuel flow between the draw pump 304 and the main fuel pump 308. Note, however, that in other exemplary aspects of the present disclosure, the fuel delivery system 300 may include one or more bypass lines and/or a fuel booster pump. However, with the inclusion of the separator 328, a size of any such fuel booster pump may not need to be as great.

From the fuel oxygen reduction unit 312, the flow of outlet fuel is provided to a third fuel line 332 of the fuel delivery system 300. The third fuel line 332 of the fuel delivery system 300 is in fluid communication with one or more engine system heat exchangers, each engine system heat exchanger thermally coupling the third fuel line 332 (or rather a fuel flow through the third fuel line 332) to a respective engine system. More specifically, for the embodiment shown, the third fuel line 332 is in thermal communication with a first engine system heat exchanger 334 and a second engine system heat exchanger 336. The first engine system heat exchanger 334 and second engine system heat exchanger 336 may be thermally coupled to a respective first engine system 338 and second engine system 340. The first and second engine systems 338, 340 may be any suitable engine system, such as one or more of a main lubrication oil system, a variable frequency generator system, etc.

The third fuel line 332 further extends to the main fuel pump 308, such that the aforementioned one or heat exchangers 334, 336 are positioned upstream of the main fuel pump 308 and downstream of the fuel oxygen reduction unit 312. The main fuel pump 308 may further increase a pressure of the fuel flow from the third fuel line 332 and provide such relatively high pressure fuel flow through a fourth fuel line 342 of the fuel delivery system 300. Notably, the exemplary fuel delivery system 300 further includes a fuel metering unit 344 and a fifth fuel line 346. For the embodiment depicted, the fourth fuel line 342 extends to the fuel metering unit 344 of the fuel delivery system 300. The exemplary fuel metering unit 344 generally includes a fuel metering valve 348 and a bypass valve 350. The fuel metering valve 348 is positioned downstream the bypass valve 350 for the embodiment shown, but these positions may be reversed. The fuel metering valve 348 may be configured to meter a fuel flow provided to and through the fifth fuel line 346 to, e.g., a combustion device. More specifically, for the embodiment depicted, the fifth fuel line 346 is configured to provide fuel flow to one or more combustor assemblies 352 (which may be, e.g., within a combustion section of a gas turbine engine; see, e.g., FIG. 1). In such a manner, the fuel metering valve 348 may control operations of, e.g., a gas turbine engine including the one or more combustion assemblies 352 by modulating a fuel flow to such combustor assemblies 352. Accordingly, it will be appreciated that the bypass valve 350 of the fuel metering unit 344 may return fuel flow to a location upstream of the fuel metering unit 344 when such fuel is not required or desired by the combustion device (as dictated by the fuel metering valve 348). Specifically, for the embodiment shown, the bypass valve 350 is configured to return such fuel through a sixth fuel line 354 of fuel delivery system 300 to a juncture 356 in the third fuel line 332 upstream of the one or heat exchangers (i.e., heat exchangers 334, 336 for the embodiment depicted).

Briefly, it will also be appreciated that for the embodiment shown, the fuel delivery system 300 includes a third heat exchanger 358 positioned downstream of the fuel metering unit 344 and upstream of the combustor assemblies 352. The third heat exchanger 358 may also be an engine system heat exchanger configured to thermally connected the fuel flow through the fifth fuel line 346 to such engine system (i.e., a third engine system 360). The third engine system 360 thermally coupled to the third heat exchanger 358 may be the same as one of the engine systems 338, 340 described above, or alternatively, may be any other suitable engine system.

In such a manner, it will be appreciated that inclusion of the fuel oxygen reduction unit 312 having a separator 328 as described herein and positioned in the manner described herein may allow for more efficient fuel delivery system 300. For example, providing the fuel oxygen reduction unit 312 downstream of the draw pump 304 and upstream of the main fuel pump 308, heat may be added to the deoxygenated fuel upstream of the main fuel pump 308 (as well as downstream of the main fuel pump 308). Further, inclusion of a separator 328 in accordance with an embodiment described herein may allow for a reduction in size of a boost pump, or an elimination of such a boost pump (such as in the embodiment depicted), potentially saving costs and weight of the fuel delivery system 300.

In an exemplary aspect of the present disclosure, a method is provided for operating a fuel delivery system for a gas turbine engine. The method includes receiving an inlet fuel flow in an oxygen transfer assembly of a fuel oxygen reduction unit for reducing an amount of oxygen in the inlet fuel flow using a stripping gas flow through a stripping gas flowpath; separating a fuel/gas mixture into an outlet stripping gas flow and an outlet fuel flow; receiving the outlet stripping gas flow in a catalyst at a location downstream of the oxygen transfer assembly, the catalyst receiving and treating the outlet stripping gas flow from the oxygen transfer assembly, wherein a stripping gas stream flows out the catalyst; and removing water from the stripping gas stream downstream of the catalyst.

Further aspects of the invention are provided by the subject matter of the following clauses:

1. A fuel delivery system for a gas turbine engine comprising: a fuel source; a draw pump downstream of the fuel source for generating a liquid fuel flow from the fuel source; a main fuel pump downstream of the draw pump; and a fuel oxygen reduction unit downstream of the draw pump and upstream of the main fuel pump, the fuel oxygen reduction unit comprising: a stripping gas line; a contactor in fluid communication with the stripping gas line and the draw pump for forming a fuel/gas mixture, wherein the contactor receives an inlet fuel flow from the draw pump; a separator in fluid communication with the contactor, the separator receives the fuel/gas mixture and separates the fuel/gas mixture into an outlet stripping gas flow and an outlet fuel flow at a location upstream of the main fuel pump; a catalyst disposed downstream of the separator, the catalyst receives and treats the outlet stripping gas flow, wherein a stripping gas stream flows out the catalyst; and a water removal component disposed between the catalyst and the contactor, wherein the water removal component removes water from the stripping gas stream.

2. The fuel delivery system of any preceding clause, wherein an inlet stripping gas flow exits the water removal component and flows to the contactor via the stripping gas line.

3. The fuel delivery system of any preceding clause, wherein the outlet fuel flow has a lower oxygen content than the inlet fuel flow.

4. The fuel delivery system of any preceding clause, wherein the outlet fuel flow has a higher pressure than the inlet fuel flow.

5. The fuel delivery system of any preceding clause, wherein the outlet stripping gas flow has a higher oxygen content than the inlet stripping gas flow.

6. The fuel delivery system of any preceding clause, wherein the catalyst removes oxygen from the outlet stripping gas flow by chemically converting the oxygen in the outlet stripping gas flow into a water vapor and a carbon dioxide in the stripping gas stream.

7. The fuel delivery system of any preceding clause, wherein the water removal component removes the water vapor from the stripping gas stream.

8. The fuel delivery system of any preceding clause, wherein the water removal component comprises a selectively permeable membrane that only removes the water from the stripping gas stream.

9. The fuel delivery system of any preceding clause, wherein the water removal component comprises a desiccant that absorbs the water from the stripping gas stream.

10. The fuel delivery system of any preceding clause, wherein the water removal component comprises a condenser.

11. The fuel delivery system of any preceding clause, wherein the fuel oxygen reduction unit recirculates a stripping gas.

12. A fuel delivery system for a gas turbine engine comprising: a fuel oxygen reduction unit defining a stripping gas flowpath and comprising an inlet fuel line and an outlet fuel line, the fuel oxygen reduction unit comprising: an oxygen transfer assembly for reducing an amount of oxygen in an inlet fuel flow through the inlet fuel line using a stripping gas flow through the stripping gas flowpath; a catalyst in airflow communication with the stripping gas flowpath at a location downstream of the oxygen transfer assembly, the catalyst receiving and treating the stripping gas flow in the stripping gas flowpath from the oxygen transfer assembly, wherein a stripping gas stream flows out the catalyst; and a water removal component disposed downstream of the catalyst, wherein the water removal component removes water from the stripping gas stream.

13. The fuel delivery system of any preceding clause, wherein the oxygen transfer assembly comprises: a contactor including a fuel inlet that receives the inlet fuel flow from the liquid fuel flowpath and a stripping gas inlet that receives an inlet stripping gas flow from the stripping gas flowpath, the contactor configured to form a fuel/gas mixture; and a separator including an inlet in fluid communication with the contactor that receives the fuel/gas mixture, a fuel outlet, and a stripping gas outlet, wherein the separator is configured to separate the fuel/gas mixture into an outlet stripping gas flow and an outlet fuel flow and provide the outlet stripping gas flow to the stripping gas flowpath through the stripping gas outlet and the outlet fuel flow to the outlet fuel line through the fuel outlet.

14. The fuel delivery system of any preceding clause, wherein the inlet stripping gas flow exits the water removal component and flows to the contactor via a stripping gas line.

15. The fuel delivery system of any preceding clause, wherein the outlet fuel flow has a lower oxygen content than the inlet fuel flow, and wherein the outlet stripping gas flow has a higher oxygen content than the inlet stripping gas flow.

16. The fuel delivery system of any preceding clause, wherein the catalyst removes oxygen from the stripping gas flow by chemically converting the oxygen in the outlet stripping gas flow into a water vapor and a carbon dioxide in the stripping gas stream.

17. The fuel delivery system of any preceding clause, wherein the water removal component removes the water vapor from the stripping gas stream.

18. The fuel delivery system of any preceding clause, wherein the water removal component comprises a selectively permeable membrane that removes the water from the stripping gas stream.

19. The fuel delivery system of any preceding clause, wherein the water removal component comprises a desiccant that absorbs the water from the stripping gas stream.

20. The fuel delivery system of any preceding clause, wherein the water removal component comprises a condenser.

21. The fuel oxygen reduction unit of any preceding clause, wherein the gas boost pump is electrically coupled to a permanent magnet alternator (PMA).

22. The fuel oxygen reduction unit of any preceding clause, wherein the separator is electrically coupled to a permanent magnet alternator (PMA).

23. The fuel oxygen reduction unit of any preceding clause, wherein a stripping gas flow exiting the separator is not recirculated though the system.

24. The fuel oxygen reduction unit of any preceding clause, wherein the gas boost pump, the catalyst, the pre-heater, and the water removal component are in a series flow.

25. The fuel oxygen reduction unit of any preceding clause, wherein the pre-heater, the catalyst, the water removal component, and the gas boost pump are in a series flow.

26. The fuel oxygen reduction unit of any preceding clause, wherein the catalyst, the pre-heater, the gas boost pump, and the water removal component are in a series flow.

27. A method is provided for operating a fuel delivery system for a gas turbine engine. The method includes receiving an inlet fuel flow in an oxygen transfer assembly of a fuel oxygen reduction unit for reducing an amount of oxygen in the inlet fuel flow using a stripping gas flow through a stripping gas flowpath; separating a fuel/gas mixture into an outlet stripping gas flow and an outlet fuel flow; receiving the outlet stripping gas flow in a catalyst at a location downstream of the oxygen transfer assembly, the catalyst receiving and treating the outlet stripping gas flow from the oxygen transfer assembly, wherein a stripping gas stream flows out the catalyst; and removing water from the stripping gas stream downstream of the catalyst.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A fuel delivery system for a gas turbine engine comprising:
    a fuel source;
    a draw pump downstream of the fuel source for generating a liquid fuel flow from the fuel source;
    a main fuel pump downstream of the draw pump; and
    a fuel oxygen reduction unit downstream of the draw pump and upstream of the main fuel pump, the fuel oxygen reduction unit comprising:
        a stripping gas line;
        a contactor in fluid communication with the stripping gas line and the draw pump for forming a fuel/gas mixture, wherein the contactor receives an inlet fuel flow from the draw pump;
        a separator in fluid communication with the contactor, the separator receives the fuel/gas mixture and separates the fuel/gas mixture into an outlet stripping gas flow and an outlet fuel flow at a location upstream of the main fuel pump;
        a catalyst disposed downstream of the separator, the catalyst receives and treats the outlet stripping gas flow, wherein a stripping gas stream flows out the catalyst;
        a water removal component disposed between the catalyst and the contactor, wherein the water removal component removes water from the stripping gas stream; and
    a boost pump downstream of the separator and upstream of the contactor, wherein the separator and the boost pump are both coupled to, and driven by, an accessory gearbox of the gas turbine engine.

2. The fuel delivery system of claim 1, wherein an inlet stripping gas flow exits the water removal component and flows to the contactor via the stripping gas line.

3. The fuel delivery system of claim 2, wherein the outlet fuel flow has a lower oxygen content than the inlet fuel flow.

4. The fuel delivery system of claim 2, wherein the outlet fuel flow has a higher pressure than the inlet fuel flow.

5. The fuel delivery system of claim 2, wherein the outlet stripping gas flow has a higher oxygen content than the inlet stripping gas flow.

6. The fuel delivery system of claim 1, wherein the catalyst removes oxygen from the outlet stripping gas flow by chemically converting the oxygen in the outlet stripping gas flow into a water vapor and a carbon dioxide in the stripping gas stream.

7. The fuel delivery system of claim 6, wherein the water removal component removes the water vapor from the stripping gas stream.

8. The fuel delivery system of claim 1, wherein the water removal component comprises a selectively permeable membrane that only removes the water from the stripping gas stream.

9. The fuel delivery system of claim 1, wherein the water removal component comprises a desiccant that absorbs the water from the stripping gas stream.

10. The fuel delivery system of claim 1, wherein the water removal component comprises a condenser.

11. The fuel delivery system of claim 1, wherein the fuel oxygen reduction unit recirculates a stripping gas.

12. A fuel delivery system for a gas turbine engine comprising:

a fuel oxygen reduction unit defining a stripping gas flowpath and comprising an inlet fuel line and an outlet fuel line, the fuel oxygen reduction unit comprising:

an oxygen transfer assembly for reducing an amount of oxygen in an inlet fuel flow through the inlet fuel line using a stripping gas flow through the stripping gas flowpath, the oxygen transfer assembly comprising a separator;

a catalyst in airflow communication with the stripping gas flowpath at a location downstream of the oxygen transfer assembly, the catalyst receiving and treating the stripping gas flow in the stripping gas flowpath from the oxygen transfer assembly, wherein a stripping gas stream flows out the catalyst;

a water removal component disposed downstream of the catalyst, wherein the water removal component removes water from the stripping gas stream; and a boost pump downstream of the oxygen transfer assembly, wherein the separator and the boost pump are both coupled to, and driven by, an accessory gearbox of the gas turbine engine.

13. The fuel delivery system of claim 12, wherein the oxygen transfer assembly further comprises:

a contactor including a fuel inlet that receives the inlet fuel flow from a liquid fuel flowpath and a stripping gas inlet that receives an inlet stripping gas flow from the stripping gas flowpath, the contactor configured to form a fuel/gas mixture;

the separator including an inlet in fluid communication with the contactor that receives the fuel/gas mixture, a fuel outlet, and a stripping gas outlet, wherein the separator is configured to separate the fuel/gas mixture into an outlet stripping gas flow and an outlet fuel flow and provide the outlet stripping gas flow to the stripping gas flowpath through the stripping gas outlet and the outlet fuel flow to the outlet fuel line through the fuel outlet.

14. The fuel delivery system of claim 13, wherein the inlet stripping gas flow exits the water removal component and flows to the contactor via a stripping gas line.

15. The fuel delivery system of claim 14, wherein the outlet fuel flow has a lower oxygen content than the inlet fuel flow, and wherein the outlet stripping gas flow has a higher oxygen content than the inlet stripping gas flow.

16. The fuel delivery system of claim 12, wherein the catalyst removes oxygen from the stripping gas flow by chemically converting the oxygen in the outlet stripping gas flow into a water vapor and a carbon dioxide in the stripping gas stream.

17. The fuel delivery system of claim 16, wherein the water removal component removes the water vapor from the stripping gas stream.

18. The fuel delivery system of claim 12, wherein the water removal component comprises a selectively permeable membrane that removes the water from the stripping gas stream.

19. The fuel delivery system of claim 12, wherein the water removal component comprises a desiccant that absorbs the water from the stripping gas stream.

20. The fuel delivery system of claim 12, wherein the water removal component comprises a condenser.

21. A method for operating a fuel delivery system for a gas turbine engine comprising:

receiving an inlet fuel flow in an oxygen transfer assembly of a fuel oxygen reduction unit for reducing an amount of oxygen in the inlet fuel flow using a stripping gas flow through a stripping gas flowpath;

separating, by a separator, a fuel/gas mixture into an outlet stripping gas flow and an outlet fuel flow;

receiving the outlet stripping gas flow in a catalyst at a location downstream of the oxygen transfer assembly, receiving the outlet stripping gas flow in a boost pump downstream of the oxygen transfer assembly, wherein the separator and the boost pump are both coupled to, and driven by, an accessory gearbox of the gas turbine engine, the catalyst receiving and treating the outlet stripping gas flow from the oxygen transfer assembly, wherein a stripping gas stream flows out the catalyst; and removing water from the stripping gas stream downstream of the catalyst.

* * * * *